(12) United States Patent
Ku

(10) Patent No.: US 7,750,933 B2
(45) Date of Patent: Jul. 6, 2010

(54) OPTICAL SCANNING UNIT AND ELECTRO-PHOTOGRAPHIC IMAGE FORMING APPARATUS INCLUDING THE SAME

(75) Inventor: Jong-wuk Ku, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 280 days.

(21) Appl. No.: 11/867,116

(22) Filed: Oct. 4, 2007

(65) Prior Publication Data

US 2008/0292358 A1 Nov. 27, 2008

(30) Foreign Application Priority Data

May 25, 2007 (KR) .................. 10-2007-0050999

(51) Int. Cl.
*B41J 2/435* (2006.01)
*G02B 26/08* (2006.01)
*G03G 15/04* (2006.01)

(52) U.S. Cl. ..................................... 347/244; 347/258

(58) Field of Classification Search ................ 347/241, 347/244, 256, 258
See application file for complete search history.

(56) References Cited

U.S. PATENT DOCUMENTS

| 5,410,563 | A | * | 4/1995 | Nakamura et al. | 372/101 |
| 6,094,286 | A | * | 7/2000 | Kato | 359/206.1 |
| 7,133,208 | B2 | * | 11/2006 | Kim | 359/641 |
| 7,443,558 | B2 | * | 10/2008 | Sakai et al. | 359/205.1 |
| 2007/0091398 | A1 | | 4/2007 | Ueda et al. | |

OTHER PUBLICATIONS

Extended European Search Report dated Nov. 30, 2009, issued in corresponding European Patent Application No. 08150374.0.

* cited by examiner

*Primary Examiner*—Huan H Tran
(74) *Attorney, Agent, or Firm*—Staas & Halsey LLP

(57) ABSTRACT

An optical scanning unit that includes a first optical device that forms collimated light from light radiated from a light source, a second optical device that focuses the collimated light onto a deflector, and an imaging optical device that focuses light deflected by the deflector onto an exposure object. The optical scanning unit further includes a refraction unit and a diffraction unit, and the power of the refraction unit is φr, the power of the diffraction unit is φd, and the ratio φr/φd is such that 0.5<φr/φd<1.3.

22 Claims, 8 Drawing Sheets ian Application
OPTICAL SCANNING UNIT AND ELECTRO-PHOTOGRAPHIC IMAGE FORMING APPARATUS INCLUDING THE SAME

CROSS-REFERENCE TO RELATED APPLICATION

This application claims the benefit of Korean Application No. 2007-50999, filed May 25, 2007, in the Korean Intellectual Property Office, the disclosure of which is incorporated herein by reference

BACKGROUND OF THE INVENTION

1. Field of the Invention

Aspects of the present invention relate to an optical scanning unit and an electro-photographic image forming apparatus that employs the same.

2. Description of the Related Art

An electro-photographic image forming apparatus includes an optical scanning unit that scans light modulated in response to image information, to a photosensitive body (exposure object), and deflects the light in a main scanning direction using a deflector, such as a polygon mirror. The optical scanning unit includes a collimating lens, a cylindrical lens, and an fθ lens, in order to focus light radiated from a light source, onto a photosensitive body. Refractive indexes of the above lenses vary according to temperature, and such variations may cause focus movement. For example, the light radiated from the light source may not be accurately focused on the photosensitive body. Also, the wavelength of light radiated from the light source varies according to the temperature of the light source. If the wavelength of light varies, the refraction characteristics of the light are also changed. Due to the variations in wavelength of the light, focus movement can also occur. If focus movement occurs, the light may be improperly focused onto a photosensitive body, thereby reducing the quality of printed images formed by the photosensitive body.

SUMMARY OF THE INVENTION

To solve the above and/or other problems, aspects of the present invention provide an optical scanning unit, which can compensate for temperature changes and thereby prevent focus movement, and an electro-photographic image forming apparatus that employs the optical scanning unit.

According to aspects of the present invention, there is provided an optical scanning unit comprising: a light source; a first optical device that collimates light radiated from the light source; a second optical device that focuses the collimated light onto a deflector; and an imaging optical device that focuses the light deflected by the deflector onto an exposure object. The first optical device comprises a refraction unit and a diffraction unit. The power of the refraction unit is $\phi r$, the power of the diffraction unit is $\phi d$, and a ratio of $\phi r/\phi d$ satisfies the equation: $0.5 < \phi r/\phi d < 1.3$.

According to aspects of the present invention, the optical scanning unit may further comprise a supporting unit that supports the first optical device. The focal distance of the first optical device is f1, the thermal expansion coefficient of the first optical device is A1, the thermal expansion coefficient of the supporting unit is A2, the focal distance of the imaging optical device 41 is f2, and $(1-(f1/f2)) \times 0.18 < f \times \phi r \times A2/A1 < (1+(f1/f2)) \times 0.25$.

According to aspects of the present invention, the ratio $\phi r/\phi d$ may satisfy the following equation: $0.6 < \phi r/\phi d < 0.9$. The first optical device may be manufactured using a plastic injection molding method. A variation dn/dT, of the refractive index of the first optical device due to temperature changes, may satisfy the equation: $0.00007 < dn/dT < 0.00012$. The thermal expansion coefficient A1 of plastic may be less than 0.0001. A variation $d\lambda/dT$, of wavelength of the light source due to temperature changes, may satisfy the equation: $d\lambda/dT < 0.3$.

According to aspects of the present invention, there is provided an electro-photographic image forming apparatus comprising: a photosensitive body; an optical scanning unit; and a developing unit that develops a toner image by supplying toner to the electrostatic latent image formed on the photosensitive body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
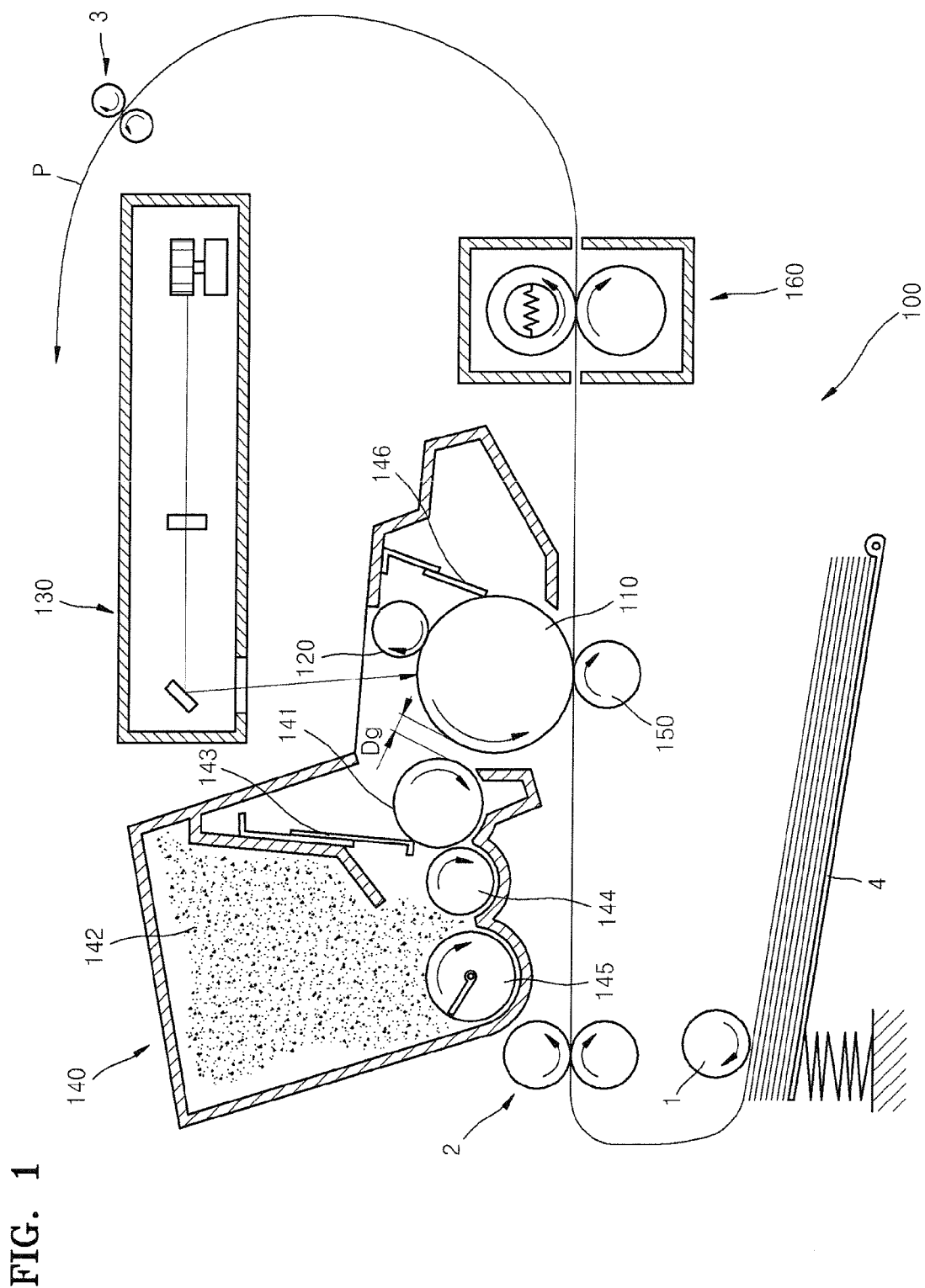
FIG. 1 is a schematic drawing showing the configuration of an electro-photographic image forming apparatus, according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will now be described more fully with reference to the accompanying drawings in which exemplary embodiments of the invention are shown.

FIG. 1 is a schematic drawing showing the configuration of an electro-photographic image forming apparatus 100, according to an exemplary embodiment of the present invention. Referring to FIG. 1, the electro-photographic image forming apparatus 100 includes a photosensitive drum 110, a charge roller 120, an optical scanning unit 130, a developing unit 140, a transfer roller 150, and a fixing unit 160.

The photosensitive drum 110 is an example of a photosensitive body, and includes a photosensitive layer having a predetermined thickness formed on an outer circumference of a cylindrical metal pipe. Although not shown, a photosensitive belt can be employed as the photosensitive body. The charge roller 120 rotates by contacting the photosensitive drum 110, and is an example of a charger that charges the surface of the photosensitive drum 110 with a uniform potential energy. A charge bias is applied to the charge roller 120. A corona charger (not shown) can be used instead of the charge roller 120. The optical scanning unit 130 forms an electrostatic latent image on the photosensitive drum 110, after the photosensitive drum 110 is charged with a uniform potential energy, by scanning light modulated in response to image information thereon.

The developing unit 140 includes a developing roller 141 that rotates facing the photosensitive drum 110. A developing bias is applied to the developing roller 141. Toner contained in a toner container 142 adheres to a surface of the developing roller 141. The toner is moved to a developing gap Dg between the photosensitive drum 110 and the developing roller 141, and adheres to the electrostatic latent image formed on the photosensitive drum 110, due to the developing bias. A control element 143 controls the amount of toner adhered to the surface of the developing roller 141. A supply roller 144 and a mixer 145 supply toner contained in the toner container 142 to the developing roller 141. A supply bias can be applied to the supply roller 144, so as to adhere the toner to the developing roller 141. The electro-photographic image forming apparatus 100 employs a non-contact developing method. That is, the surface of the developing roller 141 is separated from the surface of the photosensitive drum 110 by the developing gap Dg. Although not shown, the developing roller 141 may contact the surface of the photosensitive drum 110, and thus, a contact developing method can be employed. In this case, the outermost circumference of the developing roller 141 may be an elastic body.

The transfer roller 150 is an example of a transfer unit to transfer a toner image on the photosensitive drum to a recording medium. The transfer roller 150 forms a transferring gap between the photosensitive drum 110 and the transfer roller 150. A transfer bias is applied to the transfer roller 150, so as to transfer a toner image adhered to the photosensitive drum 110 to a recording medium P. A corona transfer unit can be used instead of the transfer roller 150.

A method of forming an image using the electro-photographic image forming apparatus 100 will now be briefly described. When a charge bias is applied to the charge roller 120, the photosensitive drum 110 is charged with a uniform potential energy. The optical scanning unit 130 scans light, which is modulated in response to image information, to the photosensitive drum 110, to form an electrostatic latent image on the outer circumference of the photosensitive drum 110. Toner contained in the toner container 142 is supplied and adhered to the surface of the developing roller 141 by the mixer 145 and the supply roller 144. The control element 143 uniformly forms a toner layer on the surface of the developing roller 141. A developing bias is applied to the developing roller 141. The toner adhered to the developing roller 141 is transferred to the electrostatic latent image formed on the photosensitive drum 110, via the developing gap Dg, due to the developing bias. A toner image is formed on the photosensitive drum 110.

A recording medium P, picked up by a pick-up roller 1 from a recording medium tray 4, is transported by a transporting roller 2 to the transferring gap between the transfer roller 150 and the photosensitive drum 110. A transfer bias is applied to the transfer roller 150. The toner image formed on the photosensitive drum 110 is transferred to the recording medium P due to electrostatic force of the transfer bias. The toner image transferred to the recording medium P is fixed to the recording medium P by receiving heat and pressure from the fixing unit 160, and thus, the printing is completed. The recording medium P is discharged to the outside by a discharge roller 3. Waste toner, which is toner that is not transferred to the recording medium P, remains on the surface of the photosensitive drum 110. The waste toner is removed from the photosensitive drum 110 by a cleaning blade 146.

Figure 2:
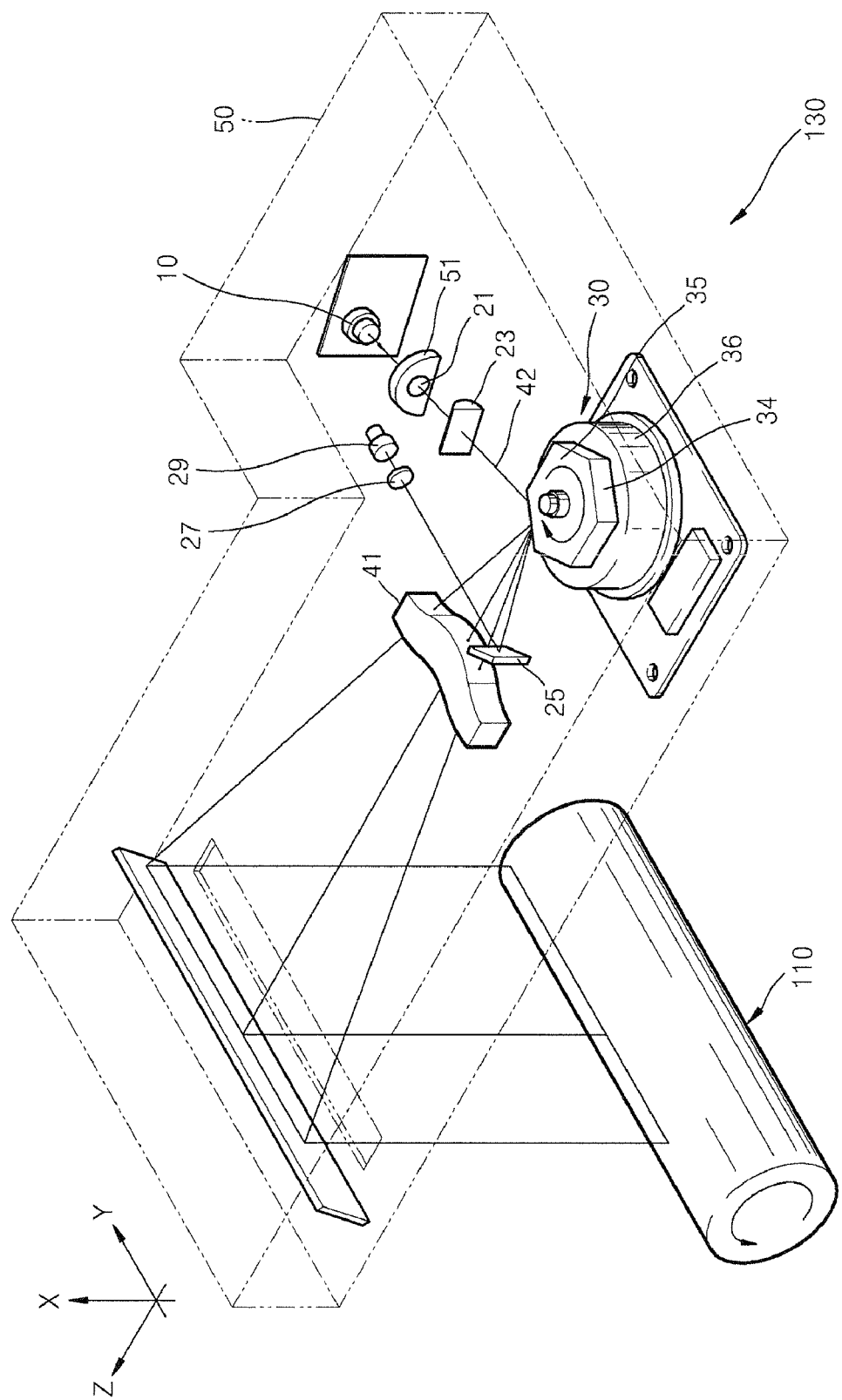
FIG. 2 is a schematic perspective view of an optical disposition of an optical scanning unit employed in the electro-photographic image forming apparatus of FIG. 1, according to an exemplary embodiment of the present invention.
Figure 3:
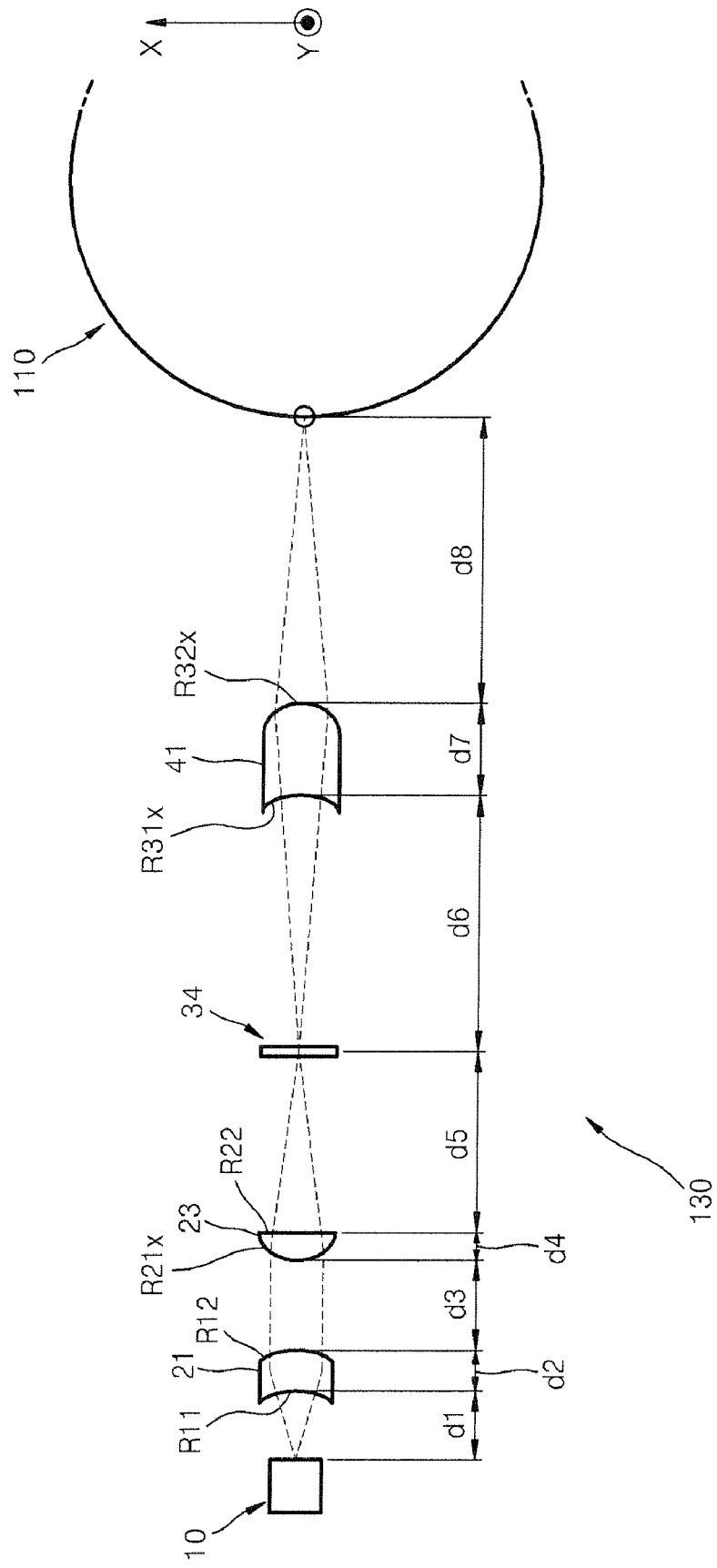
FIG. 3 is a schematic drawing showing an optical path with respect to a subordinate scanning direction of the optical scanning unit of FIG. 2, according to an exemplary embodiment of the present invention.
Figure 4:
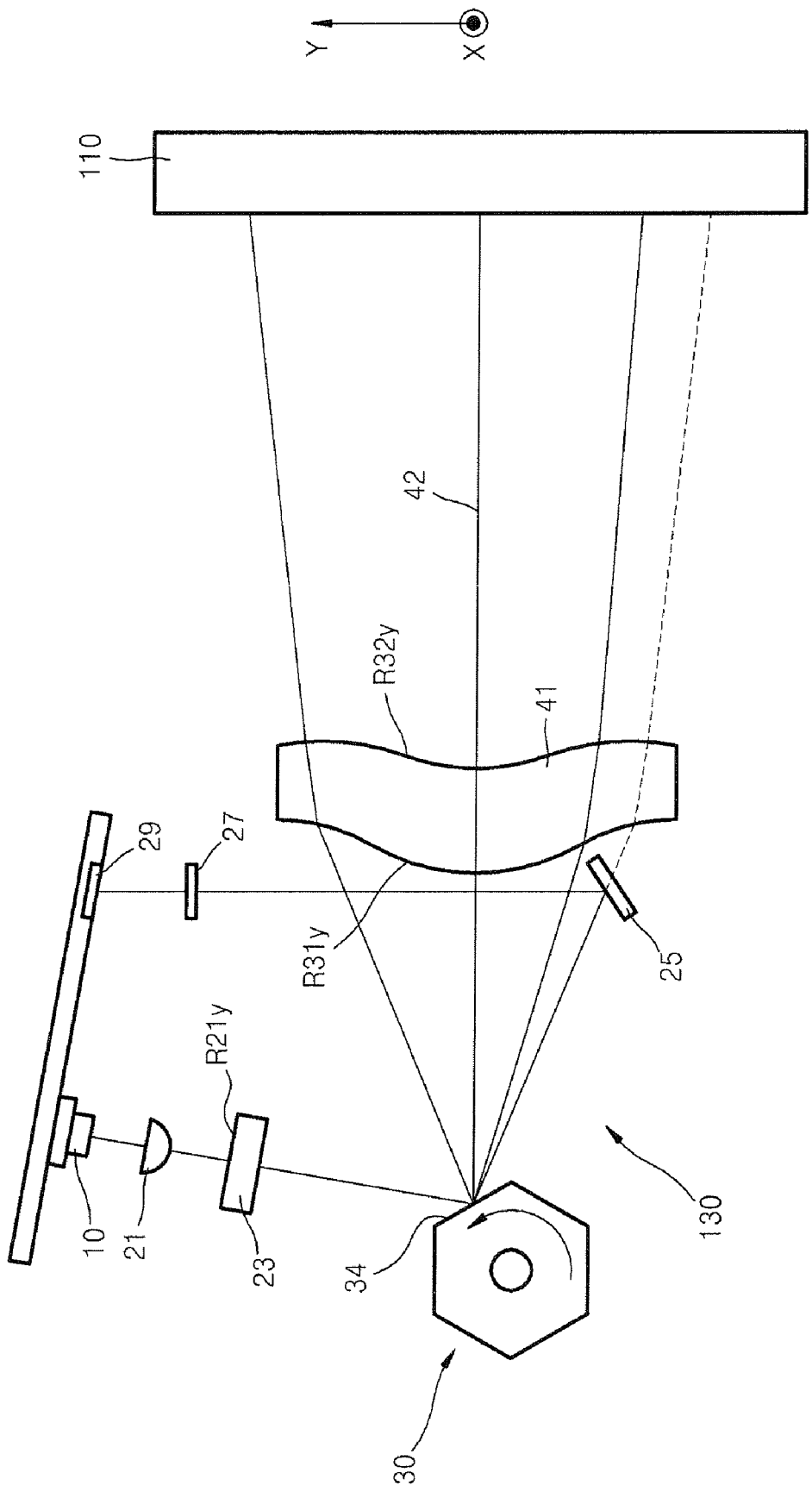
FIG. 4 is a schematic drawing showing an optical path with respect to a main scanning direction Y of the optical scanning unit of FIG. 2, according to an exemplary embodiment of the present invention.
Figure 5:
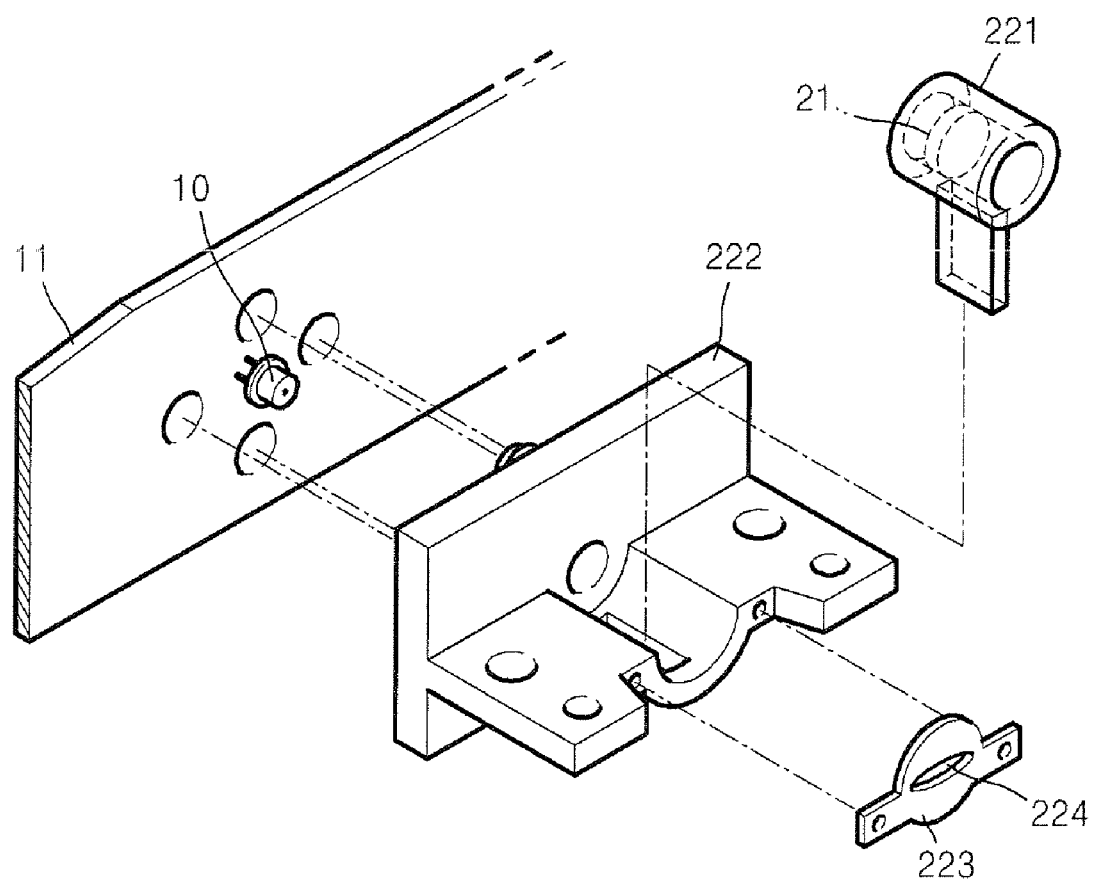
FIG. 5 is an exploded perspective view of a configuration for forming a first optical device, according to an exemplary embodiment of the present invention.
Figure 6:
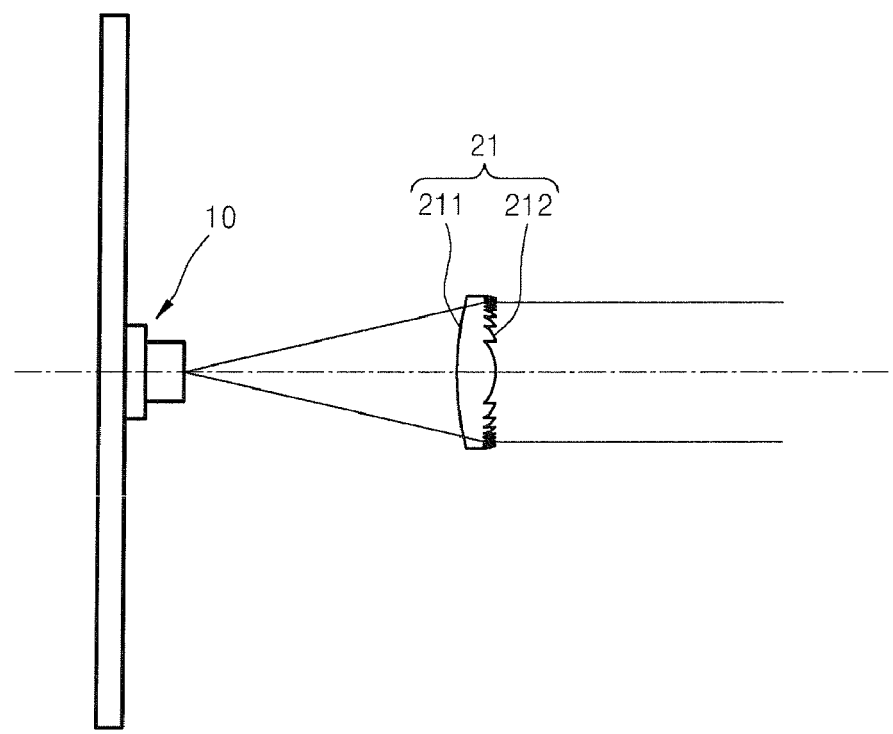
FIG. 6 is a side view of the first optical device of FIG. 5, according to an exemplary embodiment of the present invention.

FIG. 2 is a schematic perspective view of an optical disposition of the optical scanning unit 130, employed in the electro-photographic image forming apparatus of FIG. 1, according to an exemplary embodiment of the present invention. FIG. 3 is a schematic drawing showing an optical path with respect to a subordinate scanning direction of the optical scanning unit 130 of FIG. 2. FIG. 4 is a schematic drawing showing an optical path with respect to a main scanning direction Y of the optical scanning unit 130 of FIG. 2. FIG. 5 is an exploded perspective view of a configuration of a first optical device 21 of the optical scanning unit 130, according to an exemplary embodiment of the present invention. FIG. 6 is a side view of the first optical device 21, according to an exemplary embodiment of the present invention.

Referring to FIGS. 2 through 4, the optical scanning unit 130 includes a light source 10 that radiates light, and a deflector 30 that deflects the light radiated from the light source 10 in a main scanning direction Y of the photosensitive drum 110. Hereinafter, the photosensitive drum 110 will be referred to as an exposure object 110. The light source 10 can be a laser diode, a lamp, or any other suitable light source. Referring to FIG. 2, the deflector 30 includes a polygonal mirror 35 having a plurality of reflection surfaces 34 and a motor 36 that rotates the polygonal mirror 35.

The first optical device 21 and a second optical device 23 are located on an optical path between the light source 10 and the deflector 30. The first optical device 21 collimates light radiated from the light source 10 to form collimated light. The second optical device 23, which comprises at least a group of cylindrical lenses, focuses the collimated light that has passed through the first optical device 21, in a direction corresponding to a subordinate scanning direction X, so that the light is linearly focused on the deflector 30. Referring to FIG. 2, the first optical device 21 is combined with a bracket 51, and the bracket 51 can be combined with a frame 50 that provides support for the optical scanning unit 130. Also, referring to FIG. 5, the first optical device 21 is combined with a housing 221, the housing 221 is combined with a sub-frame 222, and the sub-frame 222 is combined with a substrate 11, in which the light source 10 is installed. An aperture plate 223 includes a slit 224 and is combined with the sub-frame 222.

The optical scanning unit 130 further includes an imaging optical device 41. The imaging optical device 41 is disposed between the deflector 30 and the exposure object 110. The imaging optical device 41 is, for example, an fθ lens, which comprises a group of lenses, and focuses light deflected by the deflector 30 onto the exposure object 110, by compensating with different magnifications, with respect to the main scanning direction Y and the subordinate scanning direction X. The fθ lens may be a group of plastic non-spherical lenses, in order to reduce the size and number of parts of the optical scanning unit 130. Also, at least one face of the fθ lens may be a non-spherical or curved surface lens, having a varying curvature in the subordinate scanning direction X. The shape of the fθ lens, according to aspects of the present embodiment, is not limited to the shape illustrated in FIG. 2. According to the configuration described above, light radiated from the light source 10 is focused on the exposure object 110, by being deflected in the main scanning direction Y A reflection mirror 25 reflects a portion of light deflected by the deflector 30, so that the light can enter a synchronous signal detection sensor 29. A focusing lens 27 focuses light reflected by the reflection mirror 25. The synchronous signal detection sensor 29 generates a synchronization signal to match a horizontal synchronization (synchronization in the main scanning direction) of a scanning line.

The variation of refractive indexes of the first optical device 21, the second optical device 23, and the imaging optical device 41, due to temperature changes, can cause a focus movement. For example, light radiated from the light source 10 may not be accurately focused on the exposure object 110. Also, a variation of wavelength, due to temperature changes of the light source 10, can cause a focus movement. The optical scanning unit 130 compensates for the focus movement caused by the temperature changes, by using the first optical device 21. The first optical device 21, as illustrated in FIG. 6, includes a refraction unit 211 and a diffraction unit 212.

Since the first optical device 21 is located at a starting point of the optical path between the light source 10 and the exposure object 110, a performance variation of the first optical device 21, due to temperature changes, cause a very large focus movement on the exposure object 110, which is an end point of the optical path. Thus, it is desirable to compensate for the focus movement caused by the temperature changes, by using the first optical device 21.

The first optical device 21 can be formed using a plastic injection molding method. In this case, as illustrated in FIG. 6, the manufacturing of the first optical device 21, in which the refraction unit 211 and the diffraction unit 212 are formed in one unit, can be advantageous for reducing the cost of the optical scanning unit 130. Also, it is possible that a focus movement caused by temperature changes can be compensated for, by using the imaging optical device 41. However, since the imaging optical device 41 is relatively larger in size than the first optical device 21, the processing of the diffraction unit 212 is not easy, and thus is relatively more expensive.

The refraction unit 211 is a collimating lens to collimate light radiated from the light source 10. The diffraction surface of the diffraction unit 212 can be expressed in a topology polynomial Equation 1:

$$\psi(r) = \frac{2\pi}{m \times \lambda}(C_1 r^2 + C_2 r^4 + C_3 r^6 + C_4 r^8) \qquad \text{Equation (1)}$$

In Equation 1, $r = x^2 + y^2$, m is the order of diffraction, λ is standard wavelength, $C_1$ to $C_4$ are coefficients of the topology polynomial equation, x and y respectively are coordinate values in the subordinate scanning direction X and in the main scanning direction Y, when a crossing point between an optical axis 42 and the first optical device 21 is an origin. If $C_2$ to $C_4 = 0$, the power φd of the diffraction unit 212 can be expressed as $\phi d = -2 \times C_1$.

The power φr of the refraction unit 211 varies, according to temperature changes, and thus, the optical path of light that has passed through the refraction unit 211 can be distorted. When the wavelength of light radiated from the light source 10 varies, the optical path of light that has passed through the refraction unit 211 varies. The power φd of the diffraction unit 212 varies, according to the wavelength variation of the light. Thus, if the variation of power of the diffraction unit 212 can offset the variation of the power of the refraction unit 211, a focus movement caused by a temperature change can be compensated for.

For this purpose, an appropriate relationship is set up between the power φr of the refraction unit 211 and the power φd of the diffraction unit 212. Assuming that variation amounts of the power φr of the refraction unit 211 and the power φd of the diffraction unit 212, caused by the wavelength variations of light, respectively, are Δφr1 and Δφd, and a variation amount of the power φr of the refraction unit 211, caused by the temperature change of light, is Δφr2, the relationship between the power φr of the refraction unit 211 and the power φd of the diffraction unit 212 can be theoretically expressed as Δφr1+Δφd+Δφr2=0. However, in a practical optical scanning unit, there are many variables that cannot be theoretically handled. Accordingly, not all optical scanning units that have been designed using the theoretical calculation can satisfactorily compensate for focus movement.

In order to design an optical scanning unit that can compensate for focus movement, the power φr of the refraction unit 211 and the power φd of the diffraction unit 212 can be expressed using an experimental method. Thus, after designing an optical scanning unit with various configurations that can be applied to an electro-photographic image forming apparatus, a condition that can compensate for a focus movement was found by changing the power φr of the refraction unit 211 and the power φd of the diffraction unit 212. As a result, Equation 2 was obtained.

$$0.5 < \phi r / \phi d < 1.3 \qquad \text{Equation (2)}$$

If Equation 2 is satisfied, a satisfactory print compensation effect can be obtained. Also, when the thermal expansion, of the first optical device 21 and the supporting unit that supports the first optical device 21 with respect to the frame 50 of the optical scanning unit 130, is considered, if Equation 3 is satisfied, a satisfactory print compensation effect can be obtained.

$$(1-(f1/f2)) \times 0.18 < f1 \times \phi r \times A_2 / A_1 < (1+(f1/f2)) \times 0.25 \qquad \text{Equation (3)}$$

In Equation 3, f1 is the focal distance of the first optical device 21, f2 is the focal distance of the imaging optical device 41, A1 is the thermal expansion coefficient of the first optical device 21, and A2 is the thermal expansion coefficient of the supporting unit that causes a location change of the first optical device 21. In other words, referring to FIG. 2, if the first optical device 21 is installed on the frame 50, since the frame 50 functions as a supporting unit, A2 is the thermal expansion coefficient of the frame 50. Referring to FIG. 5, if the first optical device 21 is supported by the sub-frame 222, and the sub-frame 222 is mounted on the substrate 11 in which the light source 10 is installed, the sub-frame 222 performs as the supporting unit, and A2 is the thermal expansion coefficient of the sub-frame 222. Focus movements are also affected by the magnification ratio of an optical scanning apparatus, that is, the ratio between f1 and f2. Thus, in Equation 3, both the focal distance f1 of the first optical device 21 and the focal distance f2 of the imaging optical device 41 are considered.

Table 1 summarizes examples of designing an optical scanning unit using Equation 2 and Equation 3. A standard wavelength of light radiated from the light source 10 is 786.5 nm. The thermal expansion coefficient A1 of the first optical device 21 is 0.00006, and the thermal expansion coefficient A2 of the supporting unit 51 is 0.00003. The focal distance f1 of the first optical device 21 is 14.8584 mm, and the focal distance f2 of the imaging optical device 41 is 340 mm. The variation of optical wavelength, according to the temperature of the light source 10, is expressed as $d\lambda/dT=0.215\lambda/oC$.

TABLE 1

|  |  | Radius of curvature (mm) | Distance between elements (mm) | Refractive index |
|---|---|---|---|---|
| Light source | — | — | d1 = 14.2040 | — |
| Refraction unit of first optical device | R11 | −43 | d2 = 3 | 1.526248 |
|  | R12 | −12.355 | d3 = 6.3456 |  |
| Second optical device | R21y | ∞ | d4 = 3 | 1.526083 |
|  | R21x | 31.32 | — |  |
|  | R22 | ∞ | d5 = 47.147 |  |
| Polygonal mirror | — | ∞ | d6 = 38.585 | — |
| Imaging optical device | R31y | 62.65988 | d7 = 15 | 1.526083 |
|  | R31x | −9.20640765973 | — |  |
|  | R32y | 88.58408 | d8 = 111.3 |  |
|  | R32x | −9.32400932401 | — |  |
| Exposure object | — | ∞ | — | — |

Figure 7:
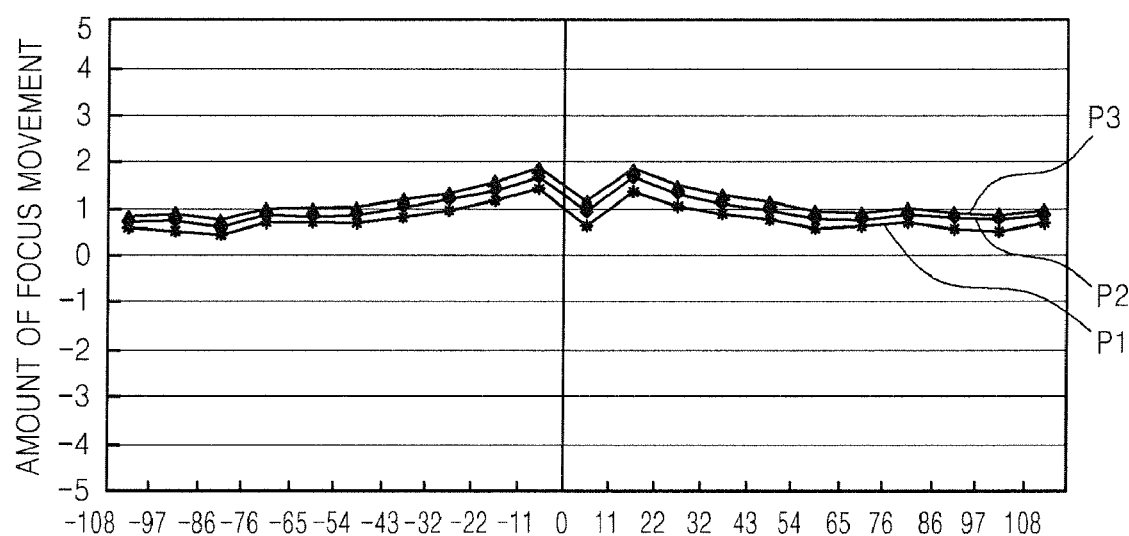
FIG. 7 is a graph showing depth of focuses at a surface of a photosensitive body shown in Table 1, according to an exemplary embodiment of the present invention.

In the above design examples, in Equation 1, $C_1 = -0.0196031709375$, and $C_2$ to $C_4 = 0$. In this case, the power $\phi d$ of the diffraction unit 212 is $-2 \times C_1 = 0.0408$, and the power $\phi r$ of the refraction unit 211 is 0.0318. Thus, $\phi r/\phi d = 0.78$, and Equation 2 is satisfied. Also, $\{(1-1-(f1/f2)) \times 0.18 = 0.172\} < \{f1 \times \phi r \times A_2/A_1 = 0.236\} < \{(1+(f1/f2)) \times 0.25 = 0.26\}$, and thus, Equation 3 is satisfied. The measured results of focus movement at this point, on the exposure object 110, are shown in FIG. 7. In FIG. 7, the horizontal axis indicates the location of the main scanning direction at the scanning surface of the exposure object 110, and the vertical axis indicates the amount of movement of the print. P1, P2, and P3 are measurement results of the amount of movement of the print at temperatures of 15° C., 35° C., and 55° C., respectively. Referring to FIG. 7, when the temperature changes approximately 20° C., the maximum focus movement is within 0.2 mm, which is a satisfactory level.

Table 2 summarizes the measurement result of ratios of power $\phi r$ and power $\phi d$, which can minimize a focus movement when a temperature of the first optical device 21 is increased 20° C., by changing the focal distance f1 of the first optical device 21. A standard wavelength of light radiated from the light source 10 is 786.5 nm. In Equation 1 which expresses the diffraction surface of the diffraction unit 212, C2 to C4=0, and, in this case, the power $\phi d$ of the diffraction unit 212 can be expressed as $-2 \times C_1$. The order of diffraction m is 1. The thermal expansion coefficient $A_1$ of the first optical device 21 is 0.00006, and the thermal expansion coefficient $A_2$ of the supporting unit is 0.00003. The focal distance f2 of the imaging optical device 41 is 340 mm.

TABLE 2

| f1 (mm) | Focus movement (mm) | C1 | $\phi d$ | $\phi d \times f1$ | $\phi r/\phi d$ | $f1 \times \phi r \times A_2/A_1$ |
|---|---|---|---|---|---|---|
| 9.93 | 0.605809 | −0.034 | 0.068 | 0.67524 | 0.62 | 0.209324 |
| 18.99 | 0.1441 | −0.0157 | 0.0314 | 0.596286 | 0.75 | 0.223607 |
| 27.51 | 0.122336 | −0.0105 | 0.021 | 0.57771 | 0.77 | 0.222418 |
| 35.55 | 0.101746 | −0.008 | 0.016 | 0.5688 | 0.79 | 0.224676 |
| 43.11 | 0.086569 | −0.0065 | 0.013 | 0.56043 | 0.81 | 0.226974 |

Figure 8:
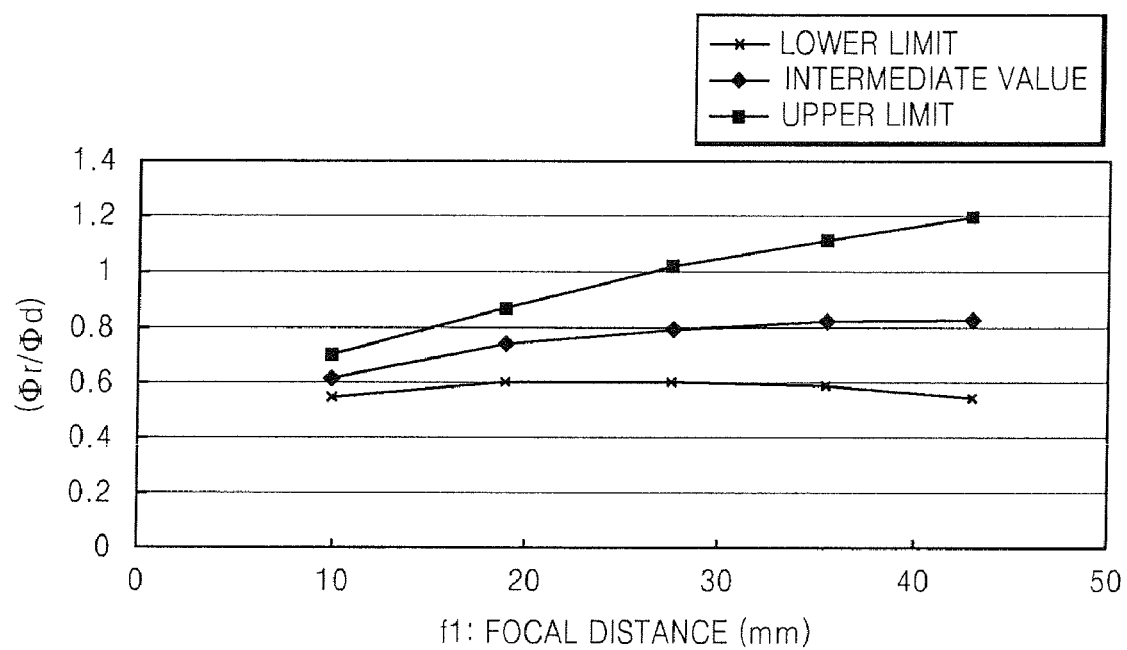
FIG. 8 is a graph showing the ratios of powers of the refractive/diffractive units $\phi r/\phi d$ that can compensate a focal distance f1 of the first optical device and focus movements.
Figure 9:
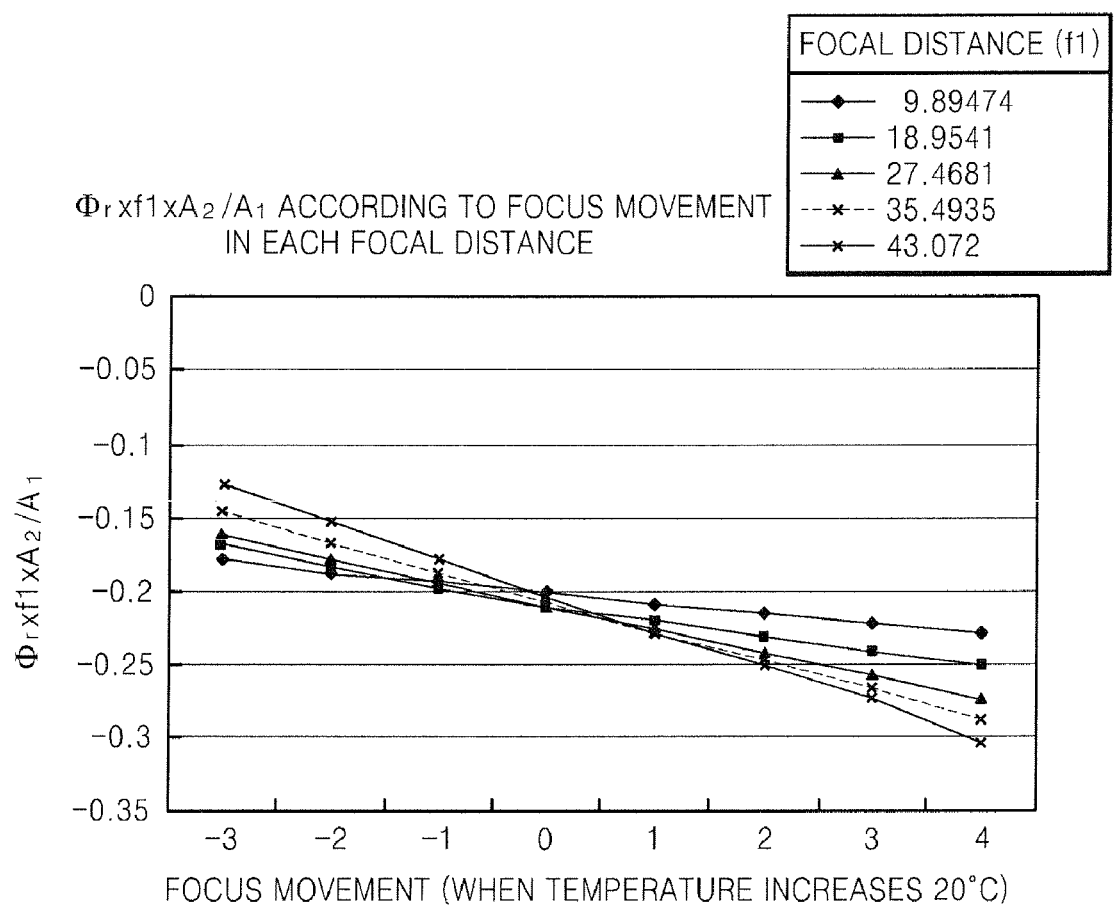
FIG. 9 is a graph showing the relationship between a focus movement and $f1 \times \phi r \times A_2/A_1$ in each of focal distances f1 of the first optical device.

As can be seen in Table 2, $\phi r/\phi d$ ranges from 0.62 to 0.81, and thus, Equation 2 is satisfied. Also, $f1 \times \phi r \times A_2/A_1$ is from 0.21 to 0.22, and thus, Equation 3 is satisfied. FIG. 8 is a graph showing a relationship between the focal distance f1 of the first optical device 21 and ratios $\phi r/\phi d$ that can compensate for the focus movement. In FIG. 8, the upper limit indicates the ratio $\phi r/\phi d$ when the permissible maximum focus movement is +2 mm, the lower limit indicates the ratio $\phi r/\phi d$ when the permissible maximum focus movement is −2 mm, and the middle value is an intermediate value between the upper limit and the lower limit. FIG. 9 is a graph showing the relationship between a focus movement and $f1 \times \phi r \times A_2/A_1$, for each of the focal distances f1 of the first optical device. Referring to Table 2 and FIGS. 8 and 9, it can be seen that, the longer the focal distance f1, the smaller the focus movement, and the ratio $\phi r/\phi d$ is nearly saturated near 0.9. On the contrary, it can be also seen that, the shorter the focal distance f1, the larger the focus movement, and the ratio $\phi r/\phi d$ is gradually reduced.

When practically designing the optical scanning unit 130, there can be a practical limit to the focal distance f1, so as to reduce the focus movement. If the focal distance f1 of the first optical device 21 is reduced, the power $\phi d$ of the diffraction unit 212 increases, and thus, a processing of the diffraction unit 212 is more difficult. Accordingly, considering the processability of the first optical device 21, and taking into consideration that the range of the practical limit of focal distance f1 is 10 to 50 mm, in designing the optical scanning unit 130, the ratio $\phi r/\phi d$ may be $0.5 < \phi r/\phi d < 1.3$. If the range of the ratio $\phi r/\phi d$ is $0.6 < \phi r/\phi d < 0.9$, the optical scanning unit 130 may have a greater permissible margin. Such a permissible margin means that a permissible range of error, due to a variety of causes, can be increased by satisfactorily compensating for the focus movement caused by temperature changes. Thus, a relatively large amount of freedom can be ensured in designing an optical system.

Table 3 summarizes the measurement results of ratio $\phi r/\phi d$, of the powers of the refraction unit 211 and the diffraction unit 212 that can minimize a focus movement, when the temperature of the first optical device 21 is increased by 20° C., by changing the focal distance f1 of the first optical device 21, in consideration of the order of diffraction. A standard wavelength of light radiated from the light source 10 is 786.5 nm. The thermal expansion coefficient $A_1$ of the first optical device 21 is 0.00006, and the thermal expansion coefficient $A_2$ of the supporting unit is 0.00003. The focal distance f2 of the imaging optical device 41 is 340 mm.

TABLE 3

| f1 (mm) | Focus movement (mm) | m | C1 | φd | φd × f1 | φr/φd | f1 × φr × A$_2$/ A$_1$ |
|---|---|---|---|---|---|---|---|
| 9.93 | 0.605809 | 1 | −0.034 | 0.068 | 0.67524 | 0.62 | 0.209324 |
| 18.99 | 0.122336 | 2 | −0.00785 | 0.0314 | 0.596286 | 0.75 | 0.223607 |
| 27.51 | 0.101746 | 2 | −0.00525 | 0.021 | 0.57771 | 0.77 | 0.222418 |
| 35.55 | 0.086569 | 1 | −0.008 | 0.016 | 0.5688 | 0.79 | 0.224676 |
| 43.11 | 0.079863 | 2 | −0.00325 | 0.013 | 0.56043 | 0.81 | 0.226974 |

As can be seen from Table 3, the ratio φr/φd is 0.62 to 0.81, and thus Equation 2 is satisfied. Also, f1×φr×A2/A1 is about 0.21-0.22, and thus, Equation 3 is satisfied. The order of diffraction m may be appropriately from 1 to 5, in consideration of processability of the diffraction unit 212.

As described above, if Equations 2 and 3 are satisfied, a satisfactory focus movement compensation effect can be obtained. According to the experiments, if the first optical device 21 is formed of plastic, the thermal expansion coefficient A1 of the first optical device 21 may be less than 0.0001, and the variation of refractive index dn/dT of plastic according to temperature, may be in a range of 0.00007<dn/dT<0.00012. Also, the variation of an optical wavelength dλ/dT, of the light source 10 according to temperature, may be dλ/dT<0.3(nm/° C.). In this case, Equations 2 and 3 are satisfied. The first optical device 21 can be formed of, for example, TOPAS5013, ZEONEX E48R, or PMMA.

A focus movement occurs due to the wavelength variation of the light source 10, the variations of refractive indexes of the first optical device 21, the second optical device 23, and the imaging optical device 41, and the thermal expansion of the supporting unit that supports the first optical device 21. In general, a focus movement caused by the thermal expansion of optical devices can be neglected. However, like the first optical device 21, in the case of an optical device that generates collimated light, the variations in curvature and thickness due to thermal expansion cause a large focus movement, and thus, the print movement should be considered. The variations of refractive index and the focus movement, due to thermal expansion in the imaging optical device 41, are much smaller than that of the first optical device 21. Therefore, if the variations of refractive index and the focus movement, due to thermal expansion of the first optical device 21 and the thermal expansion of the supporting unit for the first optical device 21, are considered, the performance of the optical scanning unit 130 is not significantly affected. Accordingly, in the optical scanning unit 130, since the refraction unit 211 and the diffraction unit 212 are included in the first optical device 21, the focus movement of the optical scanning unit 130, due to temperature changes, can be readily and effectively compensated for.

As described above, an optical scanning unit, according to aspects of the present invention, and an electro-photographic image forming apparatus that employs the optical scanning unit can readily and effectively compensate for a focus movement of the optical scanning unit, due to temperature changes, by including a refraction unit and a diffraction unit in a first optical device that collimates light radiated from a light source.

Although a few exemplary embodiments of the present invention have been shown and described, it would be appreciated by those skilled in the art that changes may be made in the exemplary embodiments, without departing from the principles and spirit of the invention, the scope of which is defined in the claims and their equivalents.

What is claimed is:

1. An optical scanning unit comprising:
   a light source to radiate light;
   a first optical device comprising a refraction unit and a diffraction unit, to collimate the light radiated from the light source;
   a second optical device to focus the collimated light;
   a deflector to deflect the focused light; and
   an imaging optical device to focus the deflected light onto an exposure object, wherein,
   a power of the refraction unit is φr, a power of the diffraction unit is φd, and 0.6<φr/φd<0.9.

2. The optical scanning unit of claim 1, wherein the first optical device comprises injection molded plastic.

3. The optical scanning unit of claim 1, wherein a temperature change of the scanning unit of approximately 20° C. produces a focus movement of less than 0.2 mm.

4. An optical scanning unit comprising:
   a light source to radiate light;
   a first optical device comprising a refraction unit and a diffraction unit, to collimate the light radiated from the light source;
   a second optical device to focus the collimated light;
   a deflector to deflect the focused light; and
   an imaging optical device to focus the deflected light onto an exposure object,
   wherein a power of the refraction unit is φr, a power of the diffraction unit is φd, and 0.5<φr/φd<1.3, and
   a variation of the refractive index of the first optical device due to temperature changes is dn/dT, and 0.00007<dn/dT<0.00012.

5. An optical scanning unit comprising:
   a light source to radiate light;
   a first optical device comprising a refraction unit and a diffraction unit, to collimate the light radiated from the light source;
   a second optical device to focus the collimated light;
   a deflector to deflect the focused light; and
   an imaging optical device to focus the deflected light onto an exposure object,
   wherein a power of the refraction unit is φr, a power of the diffraction unit is φd, and 0.5<φr/φd<1.3, and
   a variation of the wavelength of the light radiated from the light source due to temperature changes is dλ/dT, and dλ/dT<0.3 nanometer/° C.

6. An optical scanning unit comprising:
   a light source to radiate light;
   a first optical device comprising a refraction unit and a diffraction unit, to collimate the light radiated from the light source;
   a second optical device to focus the collimated light;
   a deflector to deflect the focused light;
   an imaging optical device to focus the deflected light onto an exposure object; and
   a supporting unit that supports the first optical device,
   wherein a power of the refraction unit is φr, a power of the diffraction unit is φd, and 0.5<φr/φd<1.3, and the focal distance of the first optical device is f1, the thermal expansion coefficient of the first optical device is $A_1$, the thermal expansion coefficient of the supporting unit is $A_2$, the focal distance of the imaging optical device is f2, and $(1-(f1/f2))\times 0.18 < f1 \times \phi r \times A_2/A_1 < (1+(f1/f2))\times 0.25$.

7. The optical scanning unit of claim 6, wherein $0.6 < \phi r/\phi d < 0.9$.

8. The optical scanning unit of claim 6, wherein the first optical device comprises injection molded plastic.

9. The optical scanning unit of claim 8, wherein a variation of the refractive index of the first optical device due to temperature changes is dn/dT, and $0.00007 < dn/dT < 0.00012$.

10. The optical scanning unit of claim 8, wherein the thermal expansion coefficient $A_1$ of the first optical device is less than 0.0001.

11. The optical scanning unit of claim 6, wherein the variation of the wavelength of the light radiated from the light source due to temperature changes is $d\lambda/dT$, and $d\lambda/dT < 0.3$.

12. An electro-photographic image forming apparatus comprising:
   a photosensitive body;
   an optical scanning unit to form an electrostatic latent image on the photosensitive body by scanning light onto the photosensitive body; and
   a developing unit to develop an electrostatic latent image formed on the photosensitive body by supplying toner to the electrostatic latent image,
   wherein the optical scanning unit comprises:
     a light source to radiate light;
     a first optical device to collimate the radiated light;
     a second optical device to focus the collimated light;
     a deflector to deflect the focused light; and an imaging optical device to focus the deflected light onto the photosensitive body, and
     wherein the first optical device comprises a refraction unit and a diffraction unit, and the power of the refraction unit is $\phi r$, the power of the diffraction unit is $\phi d$, and $0.6 < \phi r/\phi d < 0.9$.

13. The electro-photographic image forming apparatus of claim 12, wherein the first optical device comprises injection molded plastic.

14. The electro-photographic image forming apparatus of claim 12, wherein a temperature change of the scanning unit of approximately 20° C. produces a focus movement of less than 0.2 mm.

15. An electro-photographic image forming apparatus comprising:
   a photosensitive body;
   an optical scanning unit to form an electrostatic latent image on the photosensitive body by scanning light onto the photosensitive body, the optical scanning unit comprising:
     a light source to radiate light,
     a first optical device to collimate the radiated light,
     a second optical device to focus the collimated light,
     a deflector to deflect the focused light, and
     an imaging optical device to focus the deflected light onto the photosensitive body; and
   a developing unit to develop an electrostatic latent image formed on the photosensitive body by supplying toner to the electrostatic latent image,
   wherein the first optical device comprises a refraction unit and a diffraction unit, and the power of the refraction unit is $\phi r$, the power of the diffraction unit is $\phi d$, and $0.5 < \phi r/\phi d < 1.3$, and
   a variation of the refractive index of the first optical device due to temperature changes is dn/dT, and $0.00007 < dn/dT < 0.00012$.

16. An electro-photographic image forming apparatus comprising:
   a photosensitive body;
   an optical scanning unit to form an electrostatic latent image on the photosensitive body by scanning light onto the photosensitive body, the optical scanning unit comprising:
     a light source to radiate light,
     a first optical device to collimate the radiated light,
     a second optical device to focus the collimated light,
     a deflector to deflect the focused light, and
     an imaging optical device to focus the deflected light onto the photosensitive body; and
   a developing unit to develop an electrostatic latent image formed on the photosensitive body by supplying toner to the electrostatic latent image,
   wherein the first optical device comprises a refraction unit and a diffraction unit, and the power of the refraction unit is $\phi r$, the power of the diffraction unit is $\phi d$, and $0.5 < \phi r/\phi d < 1.3$, and
   a variation of the wavelength of the radiated light due to temperature changes is $d\lambda/dT$, and $d\lambda/dT < 0.3$ nanometer/° C.

17. An electro-photographic image forming apparatus comprising:
   a photosensitive body;
   an optical scanning unit to form an electrostatic latent image on the photosensitive body by scanning light onto the photosensitive body, the optical scanning unit comprising:
     a light source to radiate light,
     a first optical device to collimate the radiated light,
     a second optical device to focus the collimated light,
     a deflector to deflect the focused light, and
     an imaging optical device to focus the deflected light onto the photosensitive body;
   a developing unit to develop an electrostatic latent image formed on the photosensitive body by supplying toner to the electrostatic latent image; and
   a supporting unit to support the first optical device,
   wherein the first optical device comprises a refraction unit and a diffraction unit, and the power of the refraction unit is $\phi r$, the power of the diffraction unit is $\phi d$, and $0.5 < \phi r/\phi d < 1.3$, and
   the focal distance of the first optical device is f1, the thermal expansion coefficient of the first optical device is $A_1$, the thermal expansion coefficient of the supporting unit is $A_2$, the focal distance of the second imaging optical device is f2, and $(1-(f1/f2))\times 0.18 < f1 \times \phi r \times A_2/A_1 < (1+(f1/f2))\times 0.25$.

18. The electro-photographic image forming apparatus of claim 17, wherein $0.6 < \phi r/\phi d < 0.9$.

19. The electro-photographic image forming apparatus of claim 17, wherein the first optical device comprises injection molded plastic.

20. The electro-photographic image forming apparatus of claim 19, wherein a variation of the refractive index of the first optical device due to temperature changes is dn/dT, and $0.00007 < dn/dT < 0.00012$.

21. The electro-photographic image forming apparatus of claim 19, wherein the thermal expansion coefficient $A_1$ of the first optical device is less than 0.0001.

22. The electro-photographic image forming apparatus of claim 17, wherein, a variation of the wavelength of the radiated light due to temperature changes is $d\lambda/dT$, and $d\lambda/dT < 0.3$.

* * * * *